US012679451B2

(12) United States Patent
Rasmussen et al.

(10) Patent No.: US 12,679,451 B2
(45) Date of Patent: Jul. 14, 2026

(54) REAR WHEEL STEERING ALIGNMENT CALIBRATION

(71) Applicant: Deere & Company, Moline, IL (US)

(72) Inventors: Noah J. Rasmussen, Cambridge, IA (US); Jason J. Wanner, Cedar Falls, IA (US); Joshua T. Lawson, Woodbury, MN (US)

(73) Assignee: Deere & Company, Moline, IL (US)

( * ) Notice: Subject to any disclaimer, the term of this patent is extended or adjusted under 35 U.S.C. 154(b) by 143 days.

(21) Appl. No.: 18/418,687

(22) Filed: Jan. 22, 2024

(65) Prior Publication Data

US 2025/0236332 A1     Jul. 24, 2025

(51) Int. Cl.
| | |
|---|---|
| *B62D 6/00* | (2006.01) |
| *A01B 69/00* | (2006.01) |
| *B60K 35/21* | (2024.01) |
| *B60K 35/26* | (2024.01) |
| *B62D 5/06* | (2006.01) |
| *B62D 5/08* | (2006.01) |
| *B62D 5/09* | (2006.01) |
| *B62D 5/10* | (2006.01) |

(52) U.S. Cl.
CPC ............ *B62D 6/002* (2013.01); *A01B 69/007* (2013.01); *B60K 35/21* (2024.01); *B60K 35/26* (2024.01); *B62D 5/064* (2013.01); *B62D 5/08* (2013.01); *B62D 5/09* (2013.01); *B62D 5/10* (2013.01); *B62D 6/001* (2013.01); *B60K 2360/167* (2024.01)

(58) Field of Classification Search
None
See application file for complete search history.

(56) References Cited

U.S. PATENT DOCUMENTS

| | | | |
|---|---|---|---|
| 4,972,916 A | 11/1990 | Miller | |
| 10,118,639 B2 | 11/2018 | Zhu et al. | |
| 10,207,735 B2 | 2/2019 | Bebernes et al. | |
| 11,396,323 B2 | 7/2022 | Eagles | |
| 2016/0318465 A1* | 11/2016 | Brooks | G06F 3/04847 |
| 2020/0239063 A1* | 7/2020 | Brooks | B62D 5/006 |

(Continued)

FOREIGN PATENT DOCUMENTS

| | | |
|---|---|---|
| EP | 0597655 A1 | 5/1994 |
| EP | 3565755 B1 | 7/2021 |
| JP | 2020006872 A | 1/2020 |

OTHER PUBLICATIONS

Extended European Search Report and Written Opinion issued in European Patent Application No. 24215183.5 dated Jun. 6, 2025, in 07 pages.

*Primary Examiner* — Adam D Tissot
(74) *Attorney, Agent, or Firm* — Lucian Wayne Beavers; Patterson Intellectual Property Law, PC

(57) ABSTRACT

A work vehicle includes steerable left and right front wheels and steerable left and right rear wheels and a manually operated steering input for steering the wheels through a hydraulic steering circuit connected to left and right front hydraulic actuators configured to steer the left and right front wheels. In order to perform a rear wheel alignment operation, the hydraulic steering circuit is bypassed so that the steering wheel can be used as an input device to steer each of the rear wheels in a steer by wire arrangement for alignment, without steering the front wheels during the alignment process.

11 Claims, 11 Drawing Sheets

(56)                    References Cited

U.S. PATENT DOCUMENTS

| | | |
|---|---|---|
| 2021/0000005 A1 | 1/2021 | Robinson |
| 2021/0127567 A1 | 5/2021 | Loukili et al. |
| 2022/0266897 A1 | 8/2022 | Lee et al. |
| 2022/0363280 A1* | 11/2022 | Calderon ............. B60W 50/06 |

* cited by examiner

REAR WHEEL STEERING ALIGNMENT CALIBRATION

FIELD OF THE DISCLOSURE

The present disclosure relates to systems and methods for alignment of wheels on a four wheel steering work vehicle.

BACKGROUND

When developing a four-wheel steer sprayer or other work vehicle with independent, completely electro-hydraulic rear steering wheels, there is a need to be able to steer the rear wheels to adjust the rear wheel angle in order to set the wheel alignment. In the past this has been done by using a button on a virtual terminal screen to provide operator input for the valve command. Pressing the virtual terminal button then drives the rear steer valves at a known/set valve command. By using the virtual terminal button, the user is unable to adjust or modify the magnitude of the command. The user cannot "feather" the wheels to the desired center position. One virtual terminal button press is set at a specified current command and length of time, and it becomes difficult to land on a desired center value when setting the rear wheel alignment due to overshoot.

SUMMARY OF THE DISCLOSURE

The present disclosure provides a solution to the above problem wherein the manual steering wheel in the operator's cab, with an attached steering angle sensor, may be used as an input device that the operator is familiar with. To do this however, it is necessary to overcome the problem that the manual steering wheel is coupled to the front axle steering system through a mechanical hydraulic steering system, so that turning of the steering wheel normally will always steer the front wheels. This is not desired when conducting a rear wheel steering alignment. When conducting a rear wheel steering alignment calibration, each rear wheel should be calibrated one at a time with no movement of the other wheels during the alignment process. The present disclosure solves this further problem by using an electro-hydraulic steering valve to bypass the front steering actuators during the rear wheel alignment process. When this is done, turning the manual steering wheel does not steer the front wheels. This allows the system to use the steering wheel and steering angle sensor like a steer by wire system to manipulate the rear wheel steering angle in order to set the alignment. By allowing the operator to use the steering wheel in a manner they are familiar with it allows for less operator training and a more intuitive method of manipulating the rear wheel steering angle to set the alignment.

In one embodiment a work vehicle includes a vehicle frame and at least one steerable dominant end ground engaging unit supporting the vehicle frame from a ground surface. At least one steerable non-dominant end ground engaging unit supports the vehicle frame from the ground surface. At least one dominant end hydraulic steering actuator is configured to steer the at least one steerable dominant end ground engaging unit. At least one non-dominant end hydraulic steering actuator is configured to steer the at least one steerable non-dominant end ground engaging unit. A steering input device is configured to be manually moved by a human operator to input steering commands to the work vehicle. A manually powered hydraulic pump is driven by the manual movement of the steering input device to provide flow of hydraulic fluid to the at least one dominant end hydraulic steering actuator when the steering input device is manually moved by the human operator. A steering input sensor is connected to the steering input device and configured to detect the manual movement of the steering input device and to generate a steering input signal corresponding to the detected manual movement of the steering input device. A dominant end electro-hydraulic steering valve is configured to control flow of hydraulic fluid to the at least one dominant end hydraulic steering actuator to provide automated steering of the at least one steerable dominant end ground engaging unit. A non-dominant end electro-hydraulic steering valve is configured to control flow of hydraulic fluid to the at least one non-dominant end hydraulic steering actuator to provide automated steering of the at least one steerable non-dominant end ground engaging unit. A controller is operatively connected to the steering input sensor to receive the steering input signal and to control operation of the dominant end and non-dominant end electro-hydraulic steering valves, the controller being configured to provide a non-dominant end ground engaging unit alignment calibration mode in which: (1) the dominant end electro-hydraulic steering valve bypasses hydraulic fluid from the manually powered hydraulic pump past the at least one dominant end hydraulic steering actuator so that manual movement of the steering input device does not steer the at least one steerable dominant end ground engaging unit; and (2) a command signal is sent to the non-dominant end electro-hydraulic steering valve to steer an individual one of the at least one steerable non-dominant end ground engaging unit at least in part in response to the steering input signal.

A further embodiment provides a method of steering at least one non-dominant end ground engaging unit of a work vehicle having steerable left and right dominant end ground engaging units and steerable left and right non-dominant end ground engaging units and a manually operated steering input for steering the dominant end ground engaging units through a hydraulic steering circuit connected to left and right dominant end hydraulic actuators configured to steer the left and right dominant end ground engaging units, respectively, the method comprising: steering the at least one non-dominant end ground engaging unit using the steering input as an input device; and preventing the dominant end ground engaging units from steering when using the steering input as the input device for steering the at least one non-dominant end ground engaging unit.

Numerous objects, features and advantages of the present invention will be readily apparent to those skilled in the art upon a review of following description in conjunction with the accompanying drawings.

DETAILED DESCRIPTION

Figure 1:
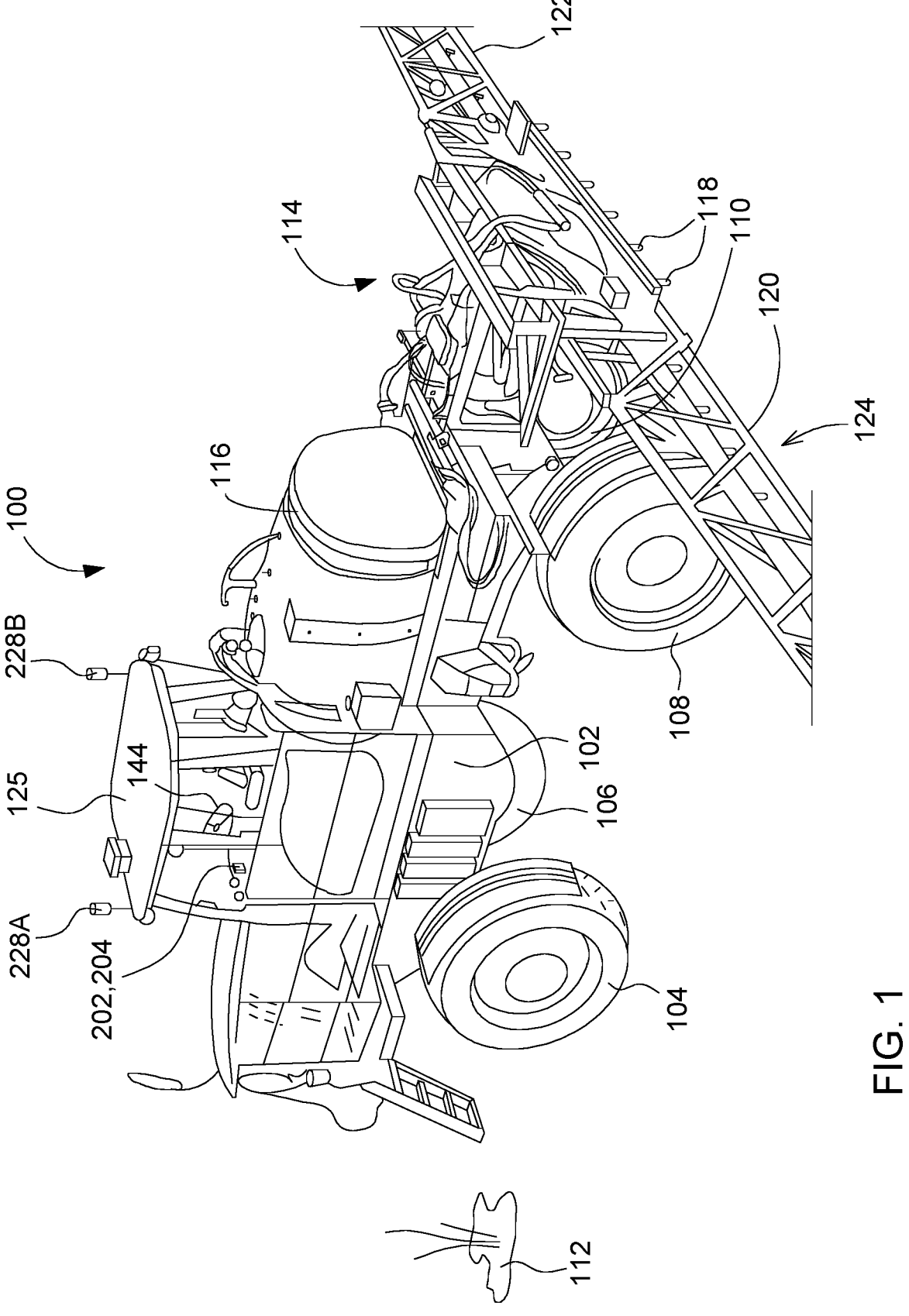
FIG. 1 is a schematic left side perspective view of a work vehicle, for example a sprayer having four wheel steering.

FIG. 1 shows a work vehicle 100, for example a four wheel drive sprayer 100 having four wheel steering. Although the present disclosure is described in the context of a sprayer 100 having four wheel steering, it will be understood that the systems disclosed herein are applicable to other work vehicles having four wheel steering.

The work vehicle 100 includes a vehicle frame 102. Left and right front wheels 104 and 106, and left and right rear wheels 108 and 110 support the vehicle frame 102 from a ground surface 112. The wheels 104-110 may all be steerable powered drive wheels. The wheels may be more generally referred to as ground engaging units, and the ground engaging units may also be tracked ground engaging units. Although the vehicle frame 102 is shown as a rigid frame, it could also be an articulated frame wherein a front frame portion is pivotable relative to a rear frame portion about a vertical pivot axis.

The work vehicle 100 may be described as having at least one steerable front ground engaging unit 104, 106 and at least one steerable rear ground engaging unit 108, 110. It will be understood that some work vehicles may have more or less than four supporting ground engaging units. For example, a three wheeled work vehicle may have one front wheel and two rear wheels.

The work vehicle 100 further includes a spraying system 114 having a tank 116 containing a liquid that is to be applied to the ground surface 112. The tank 116 is fluidly connected to a plurality of spray nozzles 118 of the spraying system 114. The spray nozzles 118 are spaced apart along left and right boom arms 120 and 122 of a boom assembly 124. The boom arms 120 and 122 are movable between a deployed position shown in FIG. 1, and a storage or transport position (not shown) wherein the arms are folded up alongside the vehicle frame 102.

Figure 2:
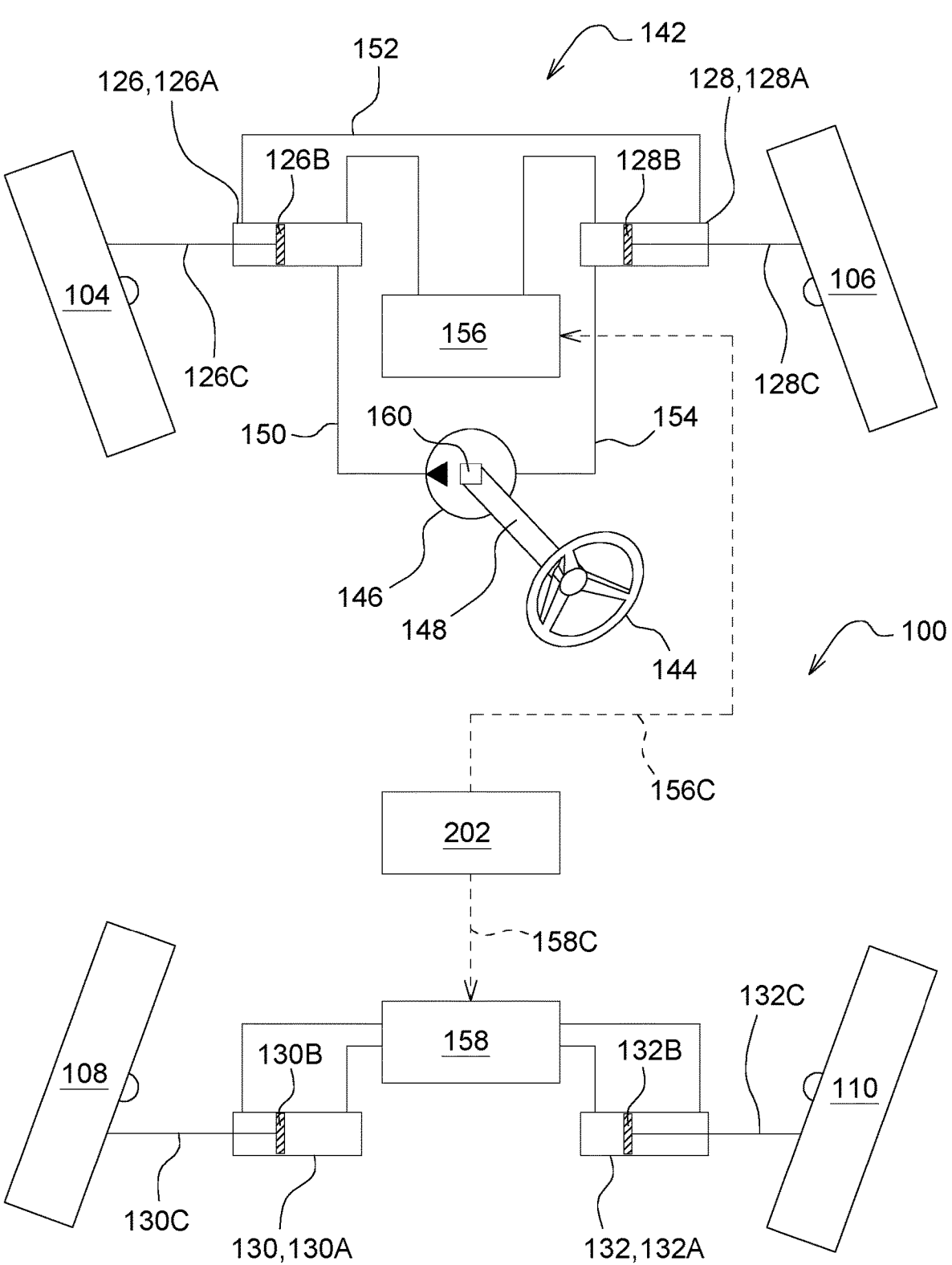
FIG. 2 is a schematic plan view of the hydraulic steering system of the work vehicle having four wheel steering.
Figure 2A:
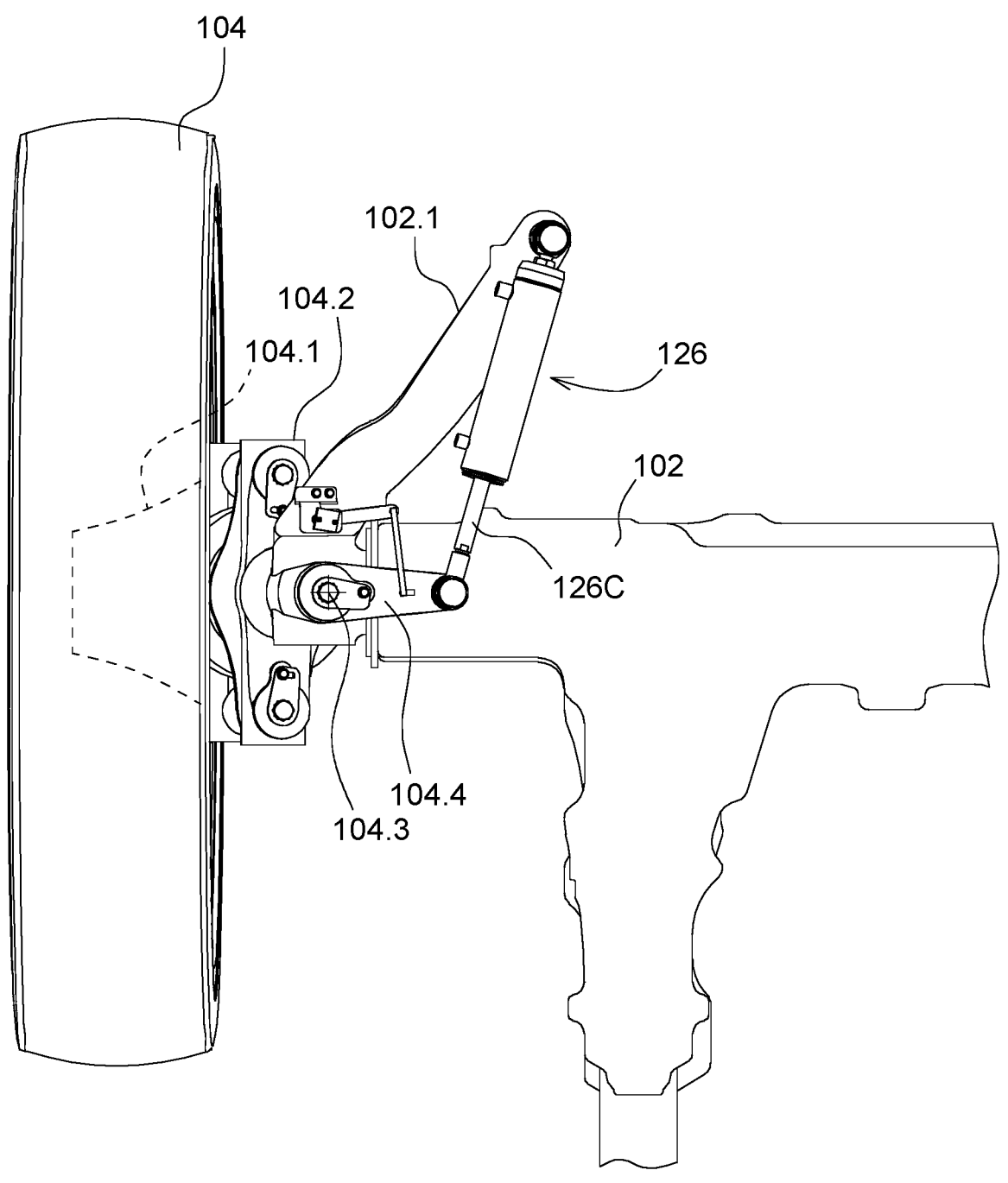
FIG. 2A is a schematic drawing of the steering mechanism of the left front wheel.

FIG. 2 schematically shows a plan view of the work vehicle 100 along with key portions of the hydraulic steering system. As schematically seen in FIG. 2, each of the wheels 104-110 is steerably mounted on the vehicle frame 102. As schematically shown in FIG. 2A, such mounting may for example be accomplished by mounting the wheel on a spindle axle 104.1 carried by a steering knuckle 104.2 pivotally connected to the vehicle frame 102 via steering shaft 104.3. A steering arm 104.4 is attached to the upper end of steering shaft 104.3. The left front steering actuator 126 is connected between the steering arm 104.4 and a frame extension 102.1 of the vehicle frame 102. Any other steerable mounting arrangement may be used.

On the work vehicle 100 the wheels 104, 106, 108 and 110 are steered by a left front hydraulic steering actuator 126, a right front hydraulic steering actuator 128, a left rear hydraulic steering actuator 130 and a right rear hydraulic steering actuator 132, respectively. The work vehicle 100 may be described as including at least one front hydraulic steering actuator 126, 128 configured to steer the at least one steerable front ground engaging unit 104, 106. The work vehicle 100 may further be described as including at least one rear hydraulic steering actuator 130, 132 configured to steer the at least one steerable rear ground engaging unit 108, 110. In the illustrated embodiment each of the hydraulic steering actuators is a hydraulic cylinder. For example the hydraulic cylinder 126 includes an outer cylinder 126A, a piston 126B slidable within the outer cylinder 126A, and a piston rod 126C connecting the piston to the steering mechanism of the associated wheel 104 so that hydraulic fluid pressure acting on the piston 126B moves the piston to steer the wheel. The other hydraulic actuators are similarly constructed with their components indicated by the same suffixes A, B, C.

The two front hydraulic steering actuators 126 and 128 are part of a manual hydraulic steering system 142 which includes a steering input device 144 which rotates a manually powered hydraulic pump 146. The steering input device 144 may be a steering wheel 144 which rotates a steering shaft 148 operably attached to the manually powered hydraulic pump 146. The two front hydraulic steering actuators 126 and 128 are hydraulically coupled so that they both steer together to the right or the left from a single steering input to the steering wheel 144. For example, to steer to the left as schematically shown in FIG. 2 the steering wheel 144 is turned counter-clockwise so the pump 146 pumps fluid through a left side hydraulic conduit 150 to force the left front piston 126B outward. The outer chambers of the two hydraulic cylinders 126 and 128 are connected by hydraulic connecting line 152 so that outward movement of left front piston 126B causes inward movement of right front piston 128B. Hydraulic fluid from the left side of hydraulic cylinder 128 returns to pump 146 through a right side hydraulic conduit 154.

The steering input device 144 may be described as a steering input device 144 configured to be manually moved by a human operator to input steering commands to the work vehicle 100. The pump 146 may be described as a manually powered hydraulic pump 146 driven by the manual movement of the steering input device 144 to provide flow of hydraulic fluid to the at least one front hydraulic steering actuator 126, 128 when the steering input device 144 is manually moved by the human operator. The manual hydraulic steering system 142 is more completely illustrated in FIGS. 7 and 8 as further described below.

The work vehicle 100 may be equipped with an automatic guidance system designed to provide autonomous control of the work vehicle 100. Such an automatic guidance system may include front and rear electro-hydraulic steering valves 156 and 158, respectively, controlled by a controller 202.

The front electro-hydraulic steering valve 156 may be described as a front electro-hydraulic steering valve 156 configured to control flow of hydraulic fluid to the at least one front hydraulic steering actuator 126, 128 to provide automated steering of the at least one steerable front ground engaging unit 104, 106. In the embodiment illustrated and described below a single steering command directs steering of both of the steerable front ground engaging units 104 and 106.

The rear electro-hydraulic steering valve 158 may be described as a rear electro-hydraulic steering valve 158 configured to control flow of hydraulic fluid to the at least one rear hydraulic steering actuator 130, 132 to provide automated steering of the at least one steerable rear ground engaging unit 108, 110. In the embodiment illustrated and described below the steering commands to the steerable rear ground engaging units 108 and 110 are separately controlled.

To accomplish the separate control of the steering of the rear wheels 108 and 110 the work vehicle 100 may include a steering input sensor 160 connected to the steering input device 144 and configured to detect the manual movement of the steering input device 144 and to generate a steering input signal 160S corresponding to the detected manual movement of the steering input device 144. For example the steering input sensor 160 may be a rotary sensor configured to detect rotation of steering shaft 148 to detect a speed and/or an angle of rotation of the steering wheel 144.

As is further described below the steering input signal 160S is received by a controller 202 which will control the rear electro-hydraulic steering valve 158 to direct the desired steering of either or both of the rear wheels 108 and 110. This will allow various steering modes to be selected, such as front wheel steering, rear wheel steering, four wheel steering, crab steering, and the like.

The Control System

Figure 4:
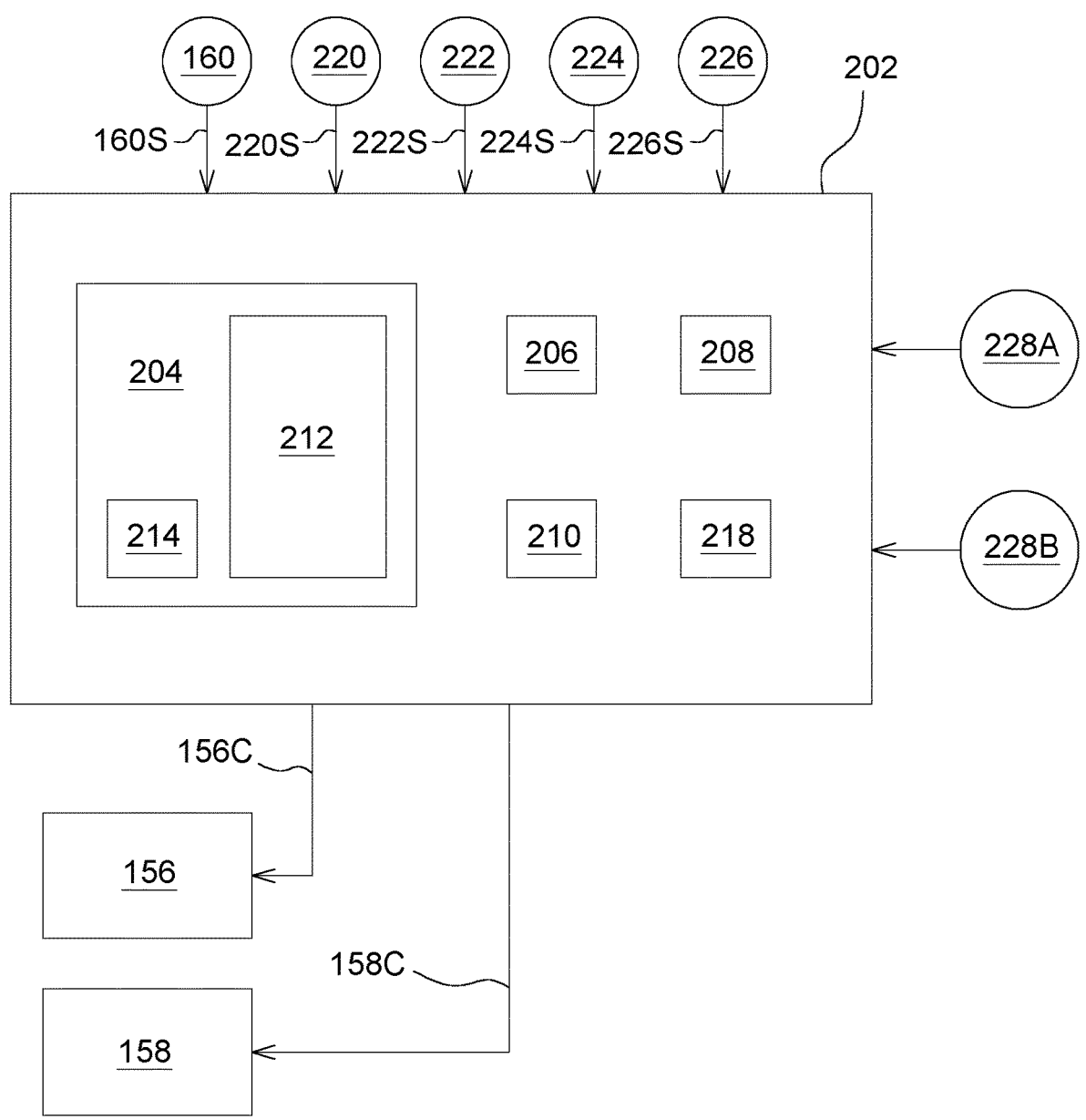
FIG. 4 is a schematic diagram of the control system of the work vehicle.
Figure 6:
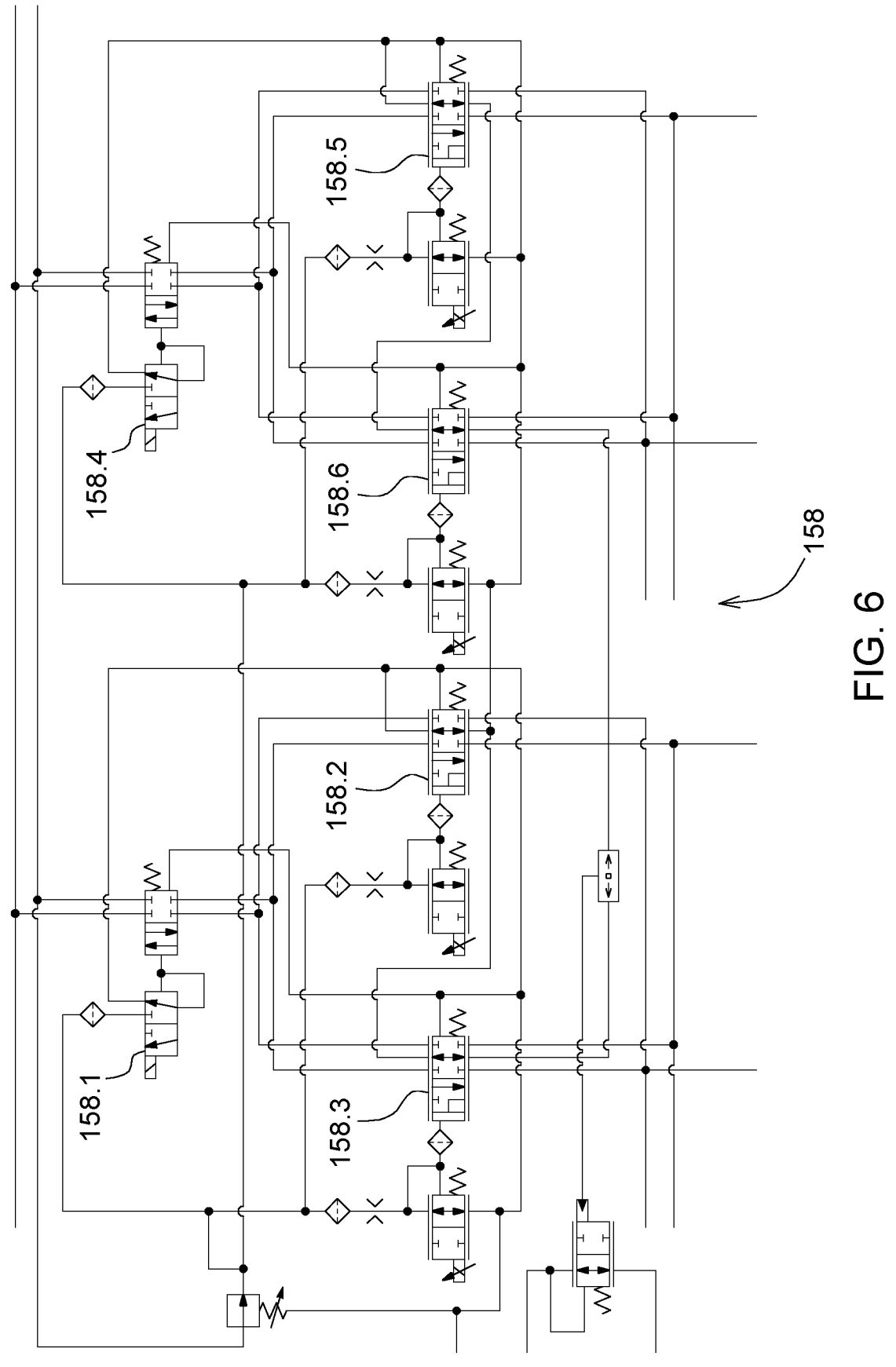
FIG. 6 is a hydraulic schematic for the rear electro-hydraulic steering valve of the work vehicle of FIG. 1.

As schematically illustrated in FIG. 4, the work vehicle 100 includes a control system 200 including a controller 202. The controller 202 may be part of the machine control system of the work vehicle 100, or it may be a separate control module. The controller 202 may for example be mounted in a control panel 204 located at an operator's station 125. Controller 202 is functionally linked to the various sensors to receive input signals from various sensors. The signals transmitted from the various sensors to the controller 202 are schematically indicated in FIG. 6 by lines connecting the sensors to the controller with an arrowhead indicating the flow of the signal from the sensor to the controller 202.

For example, controller 202 may be operatively connected to the steering input sensor 160 to receive the steering input signal 160S and to control operation of the front and rear electro-hydraulic steering valves 156 and 158.

The control system 200 may further include a plurality of steering angle sensors, one of which is associated with each of the steerable wheels or ground engaging units 104-110. A left front ground engaging unit steering angle sensor 220 is associated with the left front steerable wheel 104 and is configured to detect a steering angle of the left front steerable wheel relative to the vehicle frame 102. A right front ground engaging unit steering angle sensor 222 is associated with the right front steerable wheel 106 and is configured to detect a steering angle of the right front steerable wheel relative to the vehicle frame 102. A left rear ground engaging unit steering angle sensor 224 is associated with the left rear wheel 108 and is configured to detect a steering angle of the left rear steerable wheel relative to the vehicle frame 102. A right rear ground engaging unit steering angle sensor 226 is associated with the right rear wheel 110 and is configured to detect a steering angle of the right rear steerable wheel relative to the vehicle frame 102. The sensors 220, 222, 224, and 226 generate wheel steering angle signals 220S, 222S, 224S and 226S which are received by controller 202.

Similarly, the controller 202 will generate control signals for controlling the operation of various actuators of the work vehicle 100. As is further described below the controller 202 may also generate control signals 156C and 158C to the front and rear electro-hydraulic steering valves 156 and 158 to implement an automatic guidance mode of operation of the work vehicle 100. And as further described below the controller 202 may generate the control signals 156C and 158C to the front and rear electro-hydraulic steering valves 156 and 158 to implement a rear wheel alignment calibration mode of operation.

Controller 202 includes or may be associated with a processor 206, a computer readable medium 208, a data base 210 and the input/output module or control panel 204 having a display 212. An input/output device 214, such as a keyboard, joystick or other user interface, is provided so that the human operator may input instructions to the controller. It is understood that the controller 202 described herein may be a single controller having all of the described functionality, or it may include multiple controllers wherein the described functionality is distributed among the multiple controllers.

Various operations, steps or algorithms as described in connection with the controller 202 can be embodied directly in hardware, in a computer program product 218 such as a software module executed by the processor 206, or in a combination of the two. The computer program product 218 can reside in RAM memory, flash memory, ROM memory, EPROM memory, EEPROM memory, registers, hard disk, a removable disk, or any other form of computer-readable medium 208 known in the art. An exemplary computer-readable medium 208 can be coupled to the processor 206 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The data storage in computer readable medium 208 and/or database 210 may in certain embodiments include a database service, cloud databases, or the like. In various embodiments, the computing network may comprise a cloud server, and may in some implementations be part of a cloud application wherein various functions as disclosed herein are distributed in nature between the computing network and other distributed computing devices. Any or all of the distributed computing devices may be implemented as at least one of an onboard vehicle controller, a server device, a desktop computer, a laptop computer, a smart phone, or any other electronic device capable of executing instructions. A processor (such as a microprocessor) of the devices may be a generic hardware processor, a special-purpose hardware processor, or a combination thereof.

Automatic Guidance Mode of Operation

As noted above work vehicle 100 may be equipped with an automatic guidance system designed to provide autonomous control of the work vehicle 100. Such an automatic guidance system may include the front and rear electro-hydraulic steering valves 156 and 158, respectively. An automatic guidance system allows the controller 202 to guide the work vehicle 100 along a predetermined path over the ground surface 112 being treated by work vehicle 100. The automatic guidance system includes one or more position sensors 228A, 228B which may detect the position and orientation of work vehicle 100 in a reference system external to the work vehicle 100. For example, the position sensors 228A, 228B may be GNSS sensors configured to receive satellite signals from a Global Navigation Satellite System (GNSS). Other reference systems may also be used including laser based reference systems or a Total System.

When using such an automatic guidance system the controller 202 may control the steering of the steerable wheels 104-110 via the front and rear electro-hydraulic steering valves 156 and 158.

Figure 5:
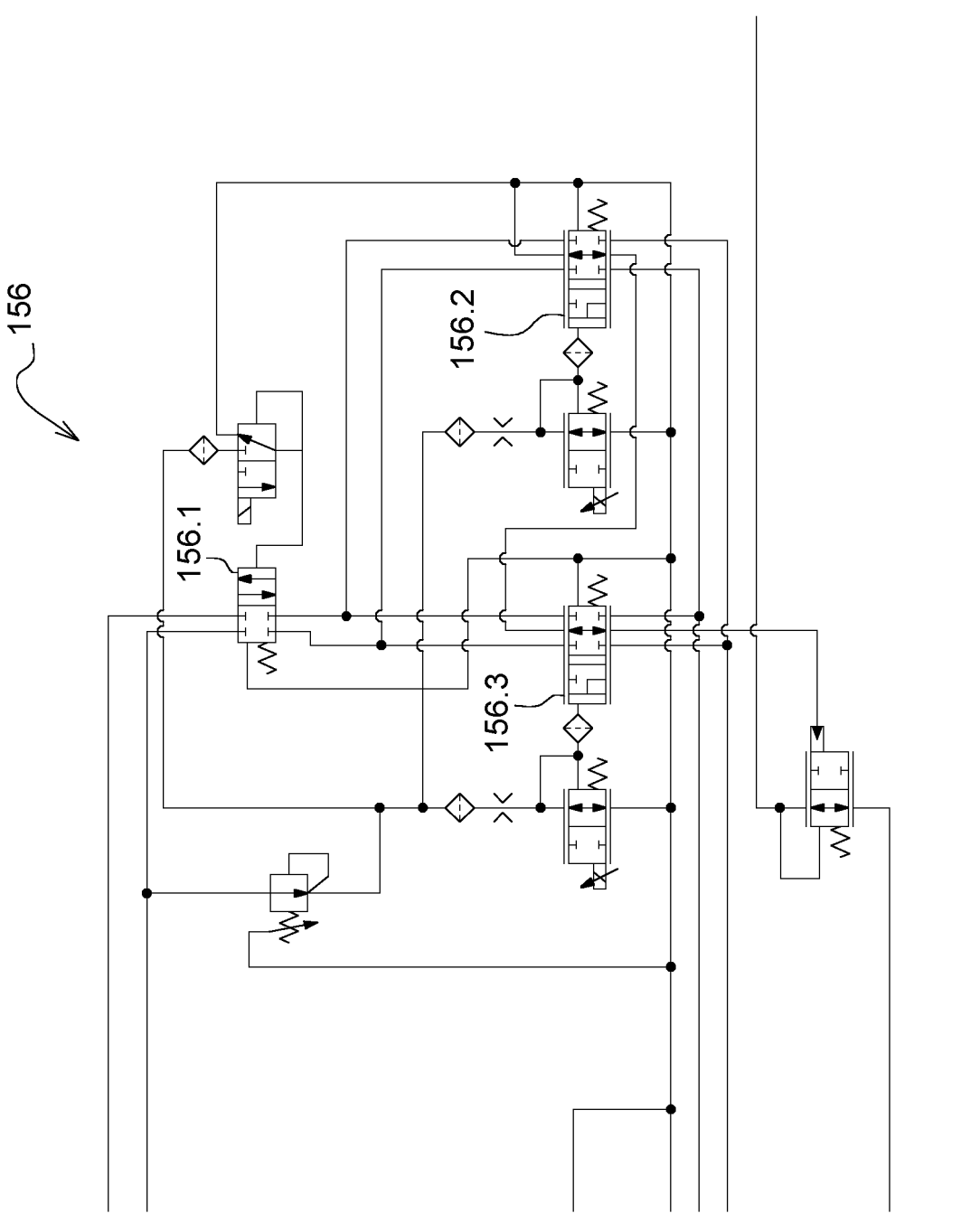
FIG. 5 is a hydraulic schematic for the front electro-hydraulic steering valve of the work vehicle of FIG. 1.

FIG. 5 is a hydraulic schematic drawing of the front electro-hydraulic steering valve 156. The front electro-hydraulic steering valve 156 includes an enable valve 156.1 and a steer left proportional valve 156.2 and a steer right proportional valve 156.3, the steer left proportional valve 156.2 being configured to direct hydraulic fluid to both the left and right front hydraulic steering actuators 126, 128 to steer the work vehicle 100 to the left, and the steer right proportional valve 156.3 being configured to direct hydraulic fluid to both the left and right front hydraulic steering actuators 126, 128 to steer the work vehicle 100 to the right.

In the embodiment shown in FIG. 5 each of the enable valve 156.1, steer left proportional valve 156.2, and steer right proportional valve 156.3 are shown as pilot operated valves, but they could also be provided in the form of non-pilot operated valves.

FIG. 6 is a hydraulic schematic drawing of the rear electro-hydraulic steering valve 158. The rear electro-hydraulic steering valve 158 includes a left side enable valve 158.1 and a left side steer left proportional valve 158.2 and a left side steer right proportional valve 158.3. The left side steer left proportional valve 158.2 is configured to direct hydraulic fluid to the left rear hydraulic steering actuator 130 to steer the left rear ground engaging unit 108 to the left, and the left side steer right proportional valve 158.3 is configured to direct hydraulic fluid to the left rear hydraulic steering actuator 130 to steer the left rear ground engaging unit 108 to the right.

The rear electro-hydraulic steering valve 158 further includes a right side enable valve 158.4 and a right side steer left proportional valve 158.5 and a right side steer right proportional valve 158.6. The right side steer left proportional valve 158.5 is configured to direct hydraulic fluid to the right rear hydraulic steering actuator 132 to steer the right rear ground engaging unit 110 to the left, and the right side steer right proportional valve 158.6 is configured to direct hydraulic fluid to the right rear hydraulic steering actuator 132 to steer the right rear ground engaging unit 110 to the right.

In the embodiment shown in FIG. 6 each of the enable valves 158.1, 158.4, steer left proportional valves 158.2, 158.5, and steer right proportional valves 158.3, 158.6 are shown as pilot operated valves, but they could also be provided in the form of non-pilot operated valves.

When the automatic guidance mode is selected the controller 202 may send command signals 156C and 158C to the front and/or rear electro-hydraulic steering valves 156 and 158 to enable the appropriate proportional valves and to steer one or more of the wheels 104-110 as needed to automatically guide the work vehicle 100 along a desired path. There is no need for any manual input from the human operator via the steering wheel 144. If the human operator does choose to override the automatic guidance system by taking control of the vehicle 100 with the steering wheel 144, the steering input sensor 160 will detect the movement of the steering wheel 144 sending a steering input signal 160S to the controller 202, in response to which the controller 202 may deactivate the automatic guidance system.

Rear Wheel Alignment Calibration Mode

Figure 3:
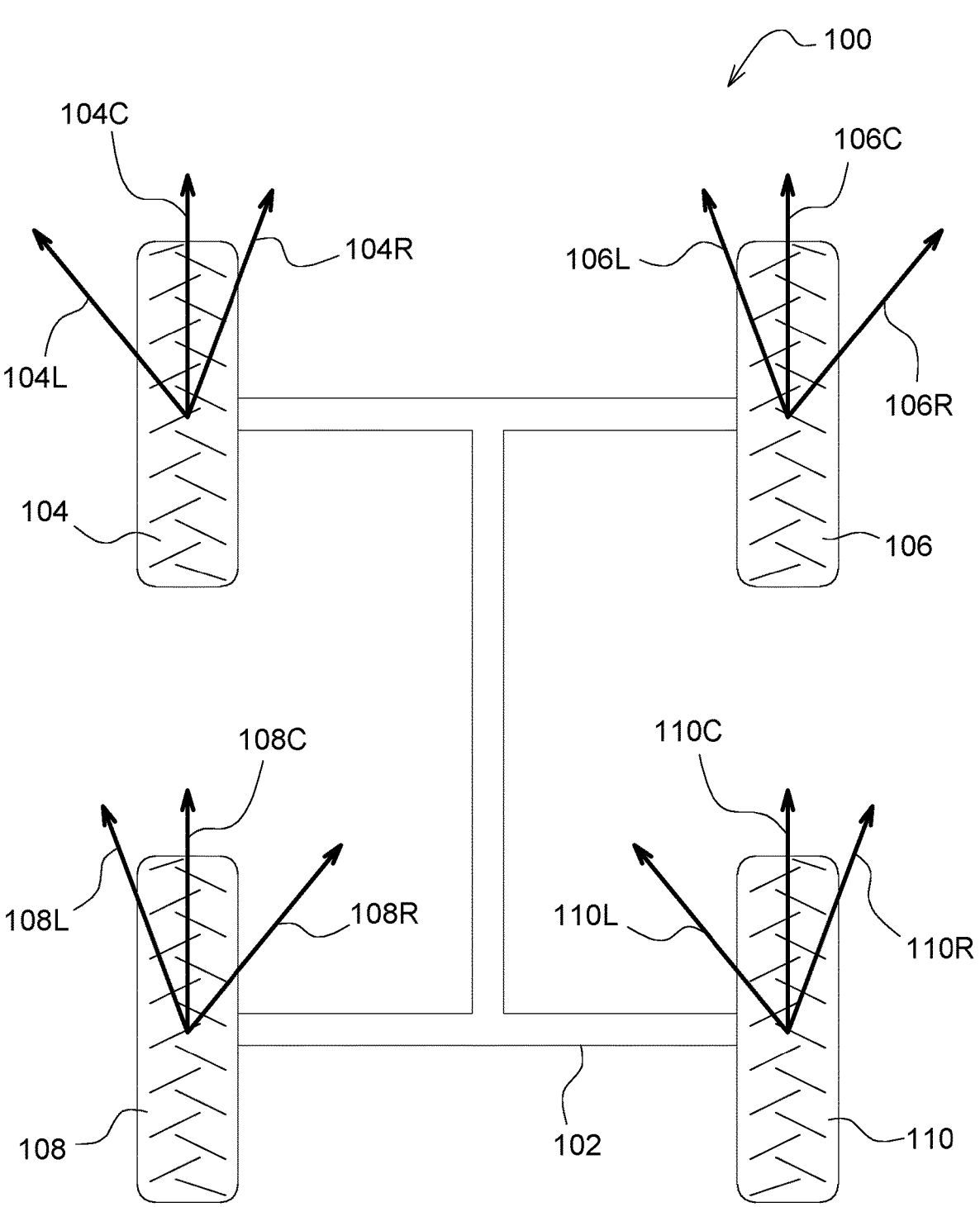
FIG. 3 is a schematic plan view of the work vehicle having four wheel steering, identifying the center steering position and range of steering of each wheel.

One issue encountered with any vehicle steering system is the need to align the wheels so they are pointed in the desired direction. For example, when the work vehicle is being steered straight ahead, as schematically shown in FIG. 3, each of the wheels 104-110 may have a center position or zero position oriented generally in the forward direction as indicated by the arrows 104C, 106C, 108C and 110C, respectively. It will be appreciated that the desired center position or zero position may in some cases not be exactly straight ahead. For example, the front wheels may be aligned with a slight toe-in so they are slightly angled toward each other. In FIG. 3 arrows angled to the left or right, and labeled such as 104L and 104R, indicate the range of allowable steering angles to the left or right of the center position for their respective wheel such as 104.

Alignment of the wheels may initially be performed upon set up of a new work vehicle 100. Re-alignment may be performed when some component of the steering system has been replaced or repaired or as periodic maintenance.

The present disclosure provides a system directed toward improved ability to perform alignment of the rear wheels 108 and 110 in a four-wheel steer work vehicle 100 with independent, completely electro-hydraulic rear steering wheels 108 and 110 as has been described above. In such a vehicle there is a need to be able to adjust the steering angle of the rear wheels to accurately set the center positions 108C and 110C. In the past this has been done by using a button on a virtual terminal screen to provide operator input for the command of the selected proportional valve 158.2, 158.3, 158.5, 158.6. Pressing the virtual terminal button then drives the rear steer valves at a known set valve command. By using such a virtual terminal button the user is unable to adjust or modify the magnitude of the command. But the user cannot "feather" the wheels to the desired centered position. One virtual terminal button press is set at a specified current command and length of time, and it becomes hard to land on a desired center value when setting the rear wheel alignment due to overshoot.

The present disclosure provides a solution to this problem by using the steering wheel 144 and the steering input sensor 160 as an input device for the human operator to control the individual steering of a selected one of the rear wheels 108 or 110, without simultaneously steering the front wheels 104 and 106. When conducting a rear wheel steering alignment calibration, with independent rear steer wheels, each rear wheel should be calibrated one at a time with no movement of the other wheels during the alignment process. To do this the mechanical hydraulic connection between the steering wheel 144 and the front wheels must somehow be disabled.

One solution provided by the present disclosure is to configure the controller 202 to provide a rear ground engaging unit alignment calibration mode in which the controller 202 sends a command signal 156C to the front rear electro-hydraulic steering valve 156 directing the front rear electro-hydraulic steering valve 156 to bypass hydraulic fluid from the manually powered hydraulic pump 146 past the steering cylinders 126 and 128 to a tank 162 of the hydraulic system so that manual movement of the steering input device 144 does not steer the front ground engaging units 104 and 106. Then the steering input device 144 and steering input sensor 160 may be used as an input device to generate a steering input signal 160S directed to the controller 202 to control a steering motion of a selected one of the rear wheels 108 and 110. The controller 202 may send a command signal 158C to the rear electro-hydraulic steering valve 158 to steer an individual one of the rear ground engaging units 108 or 110 at least in part in response to the steering input signal 160S.

As an alternative to bypassing the hydraulic fluid to the tank 162, the left and right proportional valves 156.2 and 156.3 may be cross-ported which also allows the hydraulic oil to bypass the steering cylinders 126 and 128.

Figure 7:
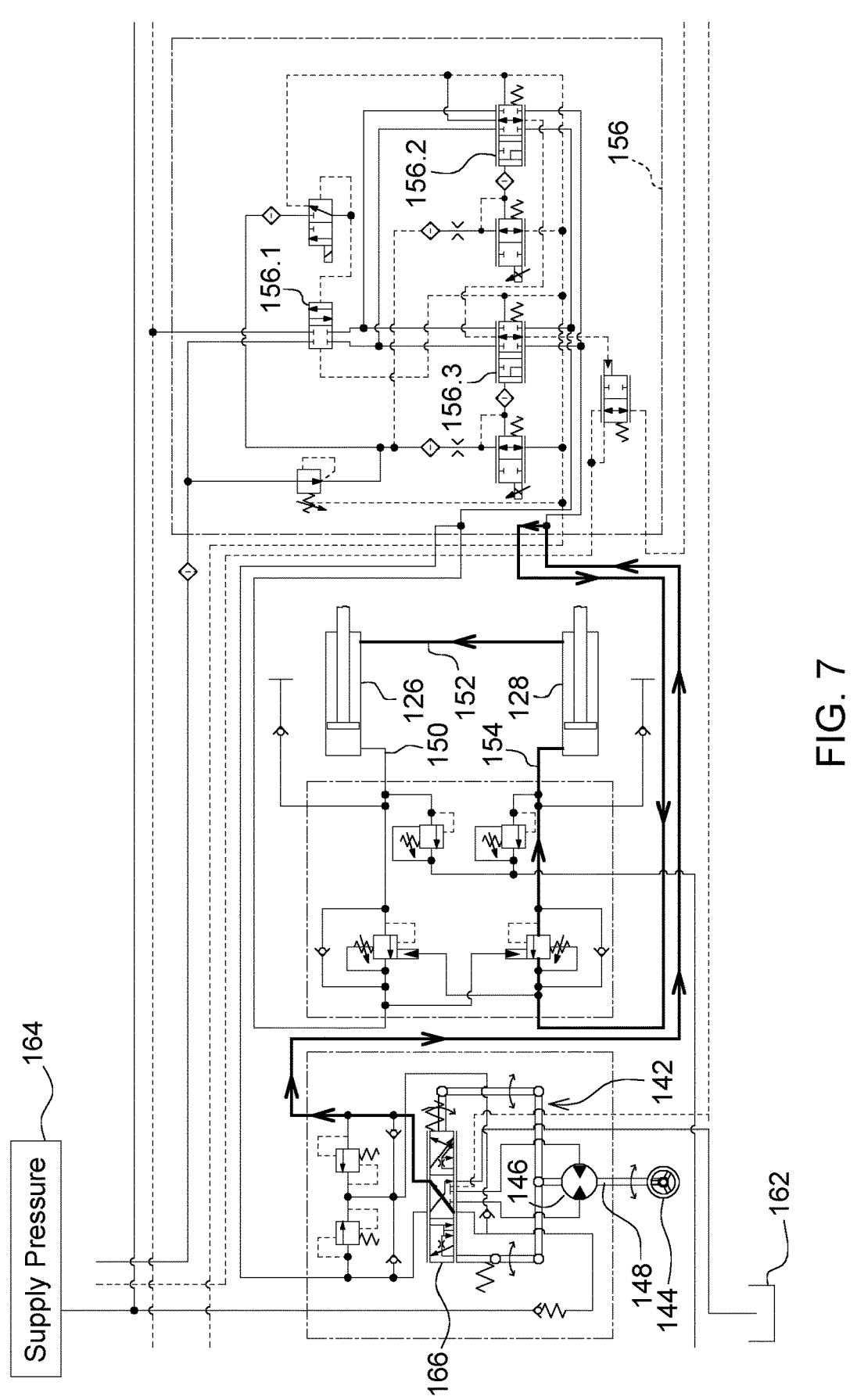
FIG. 7 is a hydraulic schematic for the front electro-hydraulic steering valve of the work vehicle of FIG. 1, as configured when making a right turn during a manual steering mode.
Figure 8:
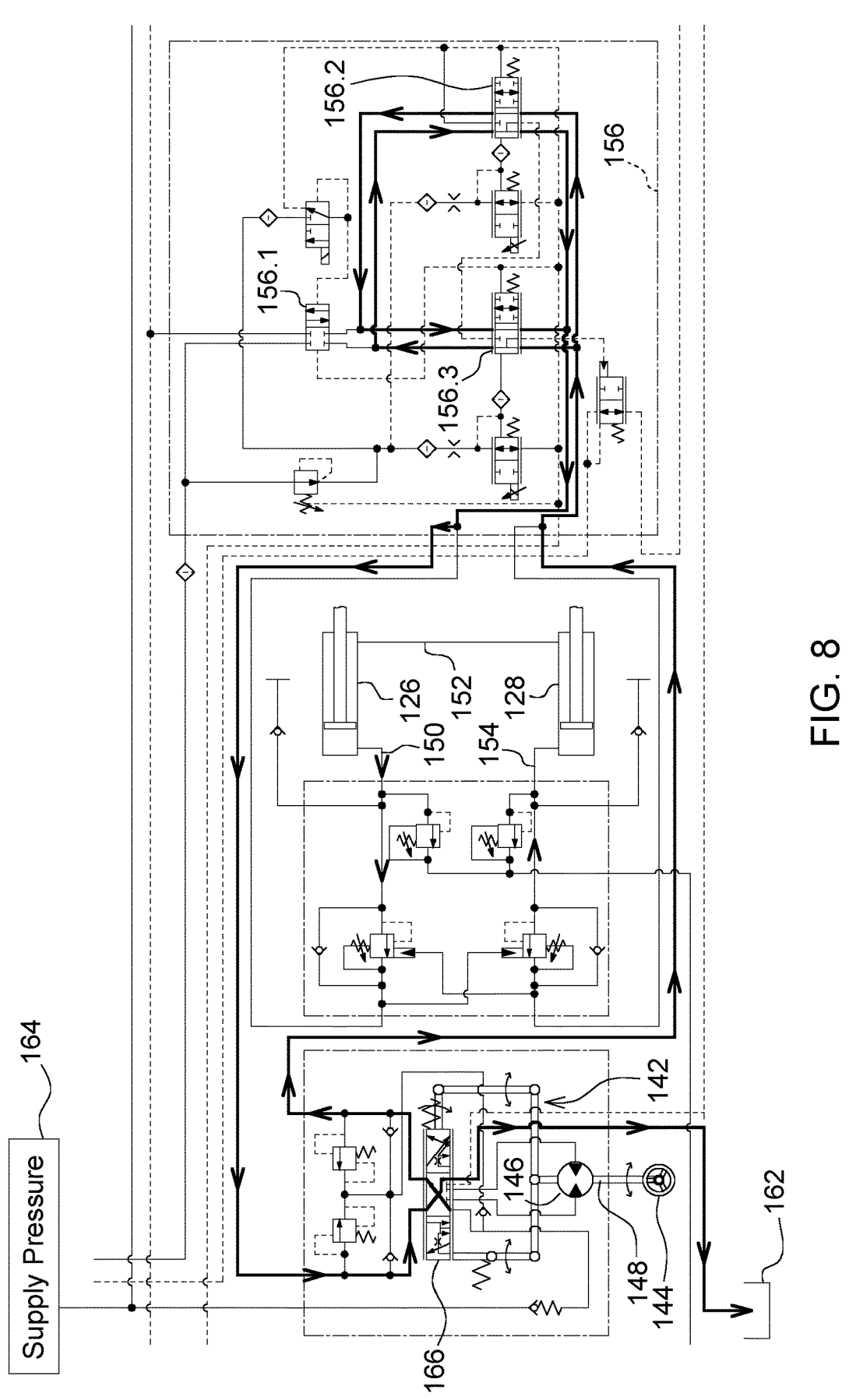
FIG. 8 shows the same hydraulic schematic as FIG. 7 for the front electro-hydraulic steering valve of the work vehicle of FIG. 1, as configured when bypassing the front steering cylinders during a rear wheel alignment calibration mode.

The configuration of the controller 202 and the front electro-hydraulic steering valve 156 in the rear wheel alignment calibration mode is best understood by comparing the configurations of the front electro-hydraulic steering valve 156 in FIGS. 7 and 8. In FIG. 7 the configuration of the front electro-hydraulic steering valve 156 during a normal manually steered right turn is shown. In FIG. 8 the configuration of the front electro-hydraulic steering valve 156 during the rear wheel alignment calibration mode is shown wherein the front electro-hydraulic steering valve 156 bypasses hydraulic fluid from the manually powered hydraulic pump 146 to the tank 162 so that the manual movement of the steering wheel 144 does not steer the front wheels 104 and 106.

As is shown in FIG. 7, the front electro-hydraulic steering valve 156 is plumbed in parallel to the manual steering system. This allows the steering cylinders 126 and 128 to be controlled either manually by operator input to the steering wheel 144, or automatically via hydraulic pressure controlled by the front electro-hydraulic steering valve 156. Hydraulic pressure to the entire hydraulic system is provided by a main hydraulic pump 164. Hydraulic fluid from the hydraulic system is returned to the tank 162. The pump 164 may recirculate hydraulic fluid from the tank 162.

During normal manual steering of the work vehicle 100 the front electro-hydraulic steering valve 156 may be de-energized. Turning movement of the steering wheel 144 by the human operator of work vehicle 100 turns manually powered hydraulic pump 146. Turning the steering wheel 144 to the right causes the pump 146 to direct increased hydraulic pressure through a manual steering valve 166 to the right front steering cylinder 128 to extend that cylinder and steer the right front wheel 106 to the right. Because the left and right front steering cylinders 126 and 128 are hydraulically coupled via the hydraulic connecting line 152 the left steering cylinder 126 will be simultaneously retracted to steer the left front wheel 104 to the right. The path of that increased pressure from the manually steering valve 166 to the right and left front steering cylinders 128 and 126 is indicated in FIG. 7 by a heavy line with arrows indicating the direction of flow.

When it is desired to disable the manually powered front hydraulic steering system 142 and to enter into the rear wheel alignment calibration mode the controller 202 directs the front electro-hydraulic steering valve 156 to reconfigure as indicated in FIG. 8. The enable valve 156.1 is maintained in an off or closed position and the steer left proportional valve 156.2 and the steer right proportional valve 156.3 are fully energized at maximum current to effectively cross port the front electro-hydraulic steering valve 156 and allow all manual steering oil to dump to the tank 162. Flow of pressurized hydraulic fluid from the manual steering valve 166 through the steer left proportional valve 156.2 and the steer right proportional valve 156.3 back to the manual steering valve 166 and to the tank 162, thereby bypassing the steering cylinders 126 and 128 is indicated in FIG. 8 by a heavy line with arrows indicating the direction of flow.

Methods of Calibration

A method of calibrating a rear wheel alignment of the work vehicle 100 will now be described with further reference to FIG. 8, and to FIGS. 9 and 10 which provide screen shots of the display 212 of the controller 202 with which the human operator may interact during the calibration of the rear wheel alignment.

Figure 9:
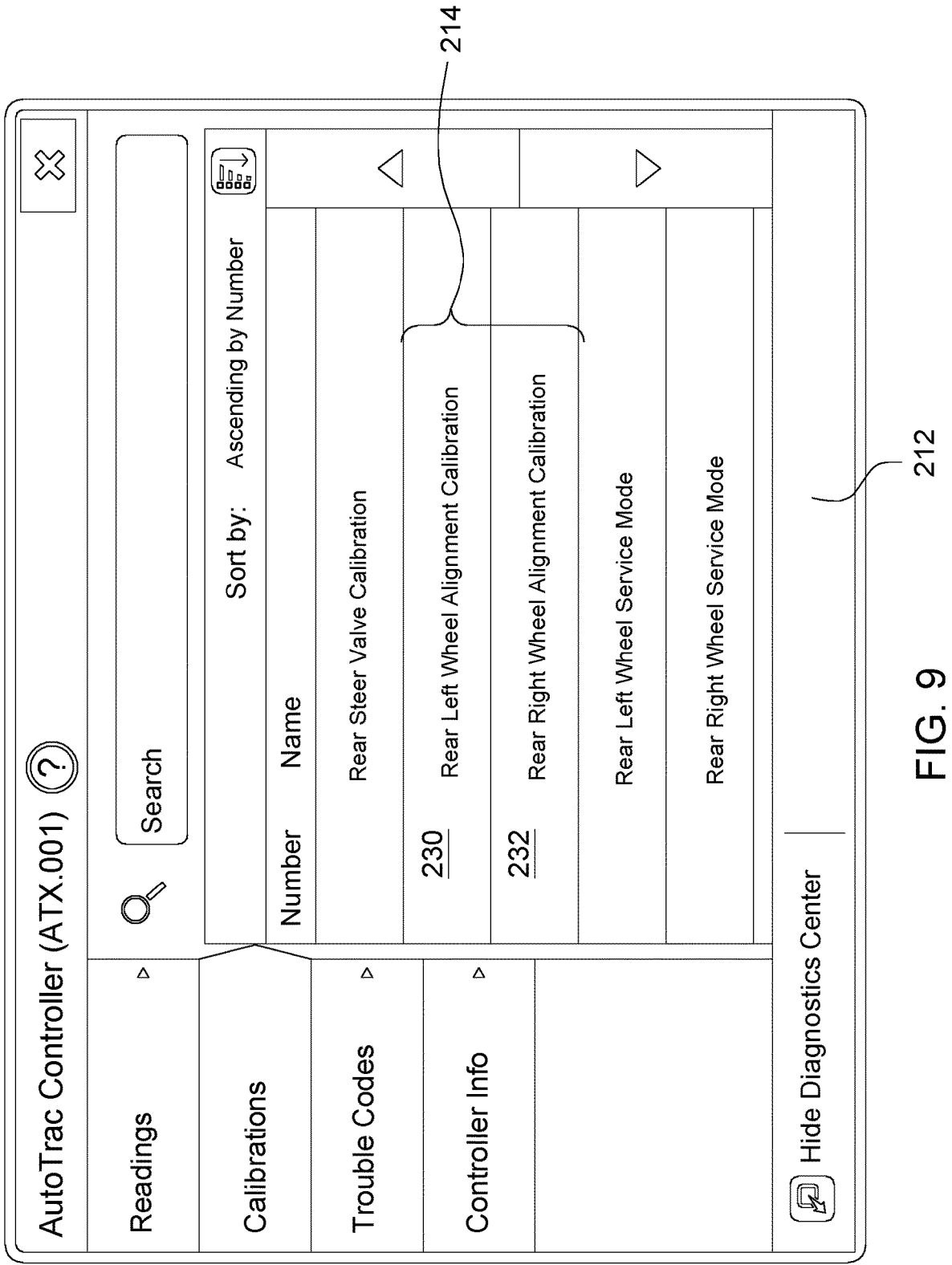
FIG. 9 is a screen shot of the control panel of the control system showing various operating modes which may be selected, including the left and right rear wheel alignment calibration modes.

As seen in FIG. 9 the controller 202 may provide to the human operator the ability to select between a left rear ground engaging unit alignment calibration mode 230 and a right rear ground engaging unit alignment calibration mode 232. The selection may be made by the operator engaging virtual buttons as part of user interface 214 on a touch screen display as shown in FIG. 9. This allows a steering alignment of each of the left and right rear wheels 108 and 110 to be individually calibrated.

Figure 10:
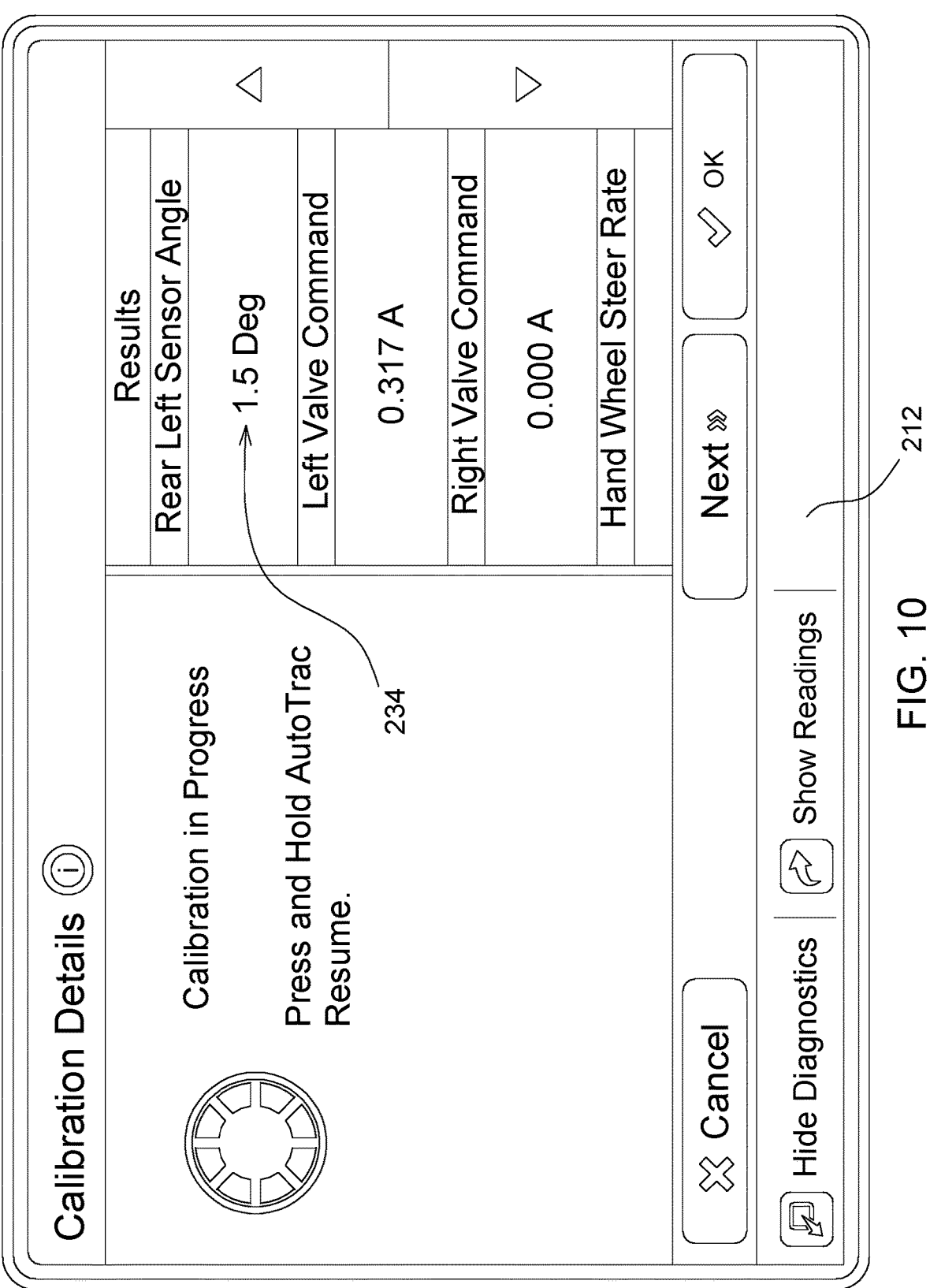
FIG. 10 is a screen shot of the control panel of the control system showing a rear wheel alignment calibration in process.

FIG. 10 displays a subsequent virtual screen provided by controller 202 on display 212 showing the display which may be viewed by the human operator as the calibration is in progress. Note that the display of FIG. 10 provides the operator with quantitative indicia representative of various operating parameters of the steering system. For example, indicia 234 is representative of the steering angle of the selected one of the left and right rear wheels, in this example the left rear wheel 108.

When either the left rear ground engaging unit alignment calibration mode 230 or the right rear ground engaging unit alignment calibration mode 232 is selected, the controller 202 will configure the front electro-hydraulic steering valve 156 as shown in FIG. 8 thereby preventing the front wheels 104 and 106 from steering when the steering wheel 144 is turned. This allows the steering wheel 144 and steering input sensor 160 to be used as an input device for setting the rear wheel alignment.

The preventing of the front wheels 104 and 106 from steering is accomplished by bypassing hydraulic fluid from the hydraulic steering circuit past the left and right front hydraulic actuators 126 and 128 to the tank 162. The bypassing is performed by configuring the front electro-hydraulic steering valve 156 as shown in FIG. 8.

The setting of the alignment of the selected rear wheel 108 or 110 can then be accomplished by manually turning the steering wheel 144, sensing the turning of the steering wheel 144 with the steering input sensor 160, generating the steering input signal 160S with the steering input sensor 160, receiving the steering input signal 160S with the automatic controller 202, and generating the command signal 158C with the automatic controller 202 directing actuation of the left or right rear hydraulic actuator 130 or 132 to adjust the steering angle of the selected one of the left and right rear wheels 108 or 110.

In one embodiment the controller 202 may be configured such that a faster manual movement of the steering input device 144 provides a larger steering angle change of the selected one of the left and right rear ground engaging units 108 or 110 and a slower manual movement of the steering input device 144 provides a smaller steering angle change of a selected one of the left and right rear ground engaging units 108 or 110. This allows the operator to quickly move the selected one of the rear ground engaging units 108 or 110 to a position close to the desired center position 108C or 110C and to then more slowly move the selected one of the rear ground engaging units 108 or 110 to the exact final position.

Alternatively, the controller 202 may be configured such that a larger manual movement of the steering input device 144 provides a larger steering angle change of the selected one of the left and right rear ground engaging units 108 or 110 and a smaller manual movement of the steering input device 144 provides a smaller steering angle change of a selected one of the left and right rear ground engaging units 108 or 110.

During this process the indicia such as 234 may be displayed to the operator on the display 212 indicating the steering angle of the selected wheel, in this case the left rear wheel 108.

The operator who is controlling the steering wheel 144 may be aided in the alignment calibration by a technician on the ground measuring the actual wheel angle via a laser measurement system or a tape measure in order to find the true wheel center position. This calibration process should be performed with the work vehicle 100 in a stationary position.

After one rear wheel alignment is completed, the other rear wheel alignment mode 230 or 232 may be selected and the process is repeated for the other rear wheel.

The system described above allows the operator to have infinitely adjustable command of the rear wheel steering alignment through an intuitive means that the operator is already familiar with, i.e. the steering wheel 144. The disclosed system uses the steering wheel 144 and steering input sensor 160 like a steer by wire system to manipulate the steering angle of a selected rear wheel in order to set the alignment. By allowing the operator to use the steering wheel 144 in a manner that they are familiar with, it allows for less operator training and a more intuitive method of manipulating the rear wheel steering angle to set the alignment.

Alternative Embodiments

The embodiment illustrated and described above is in the context of a work vehicle having its manual hydraulic steering system 142 configured to steer the front wheels and using the disclosed system to bypass that manual hydraulic steering system 142 and selectively steer at least one of the rear wheels. It will be appreciated that for a work vehicle having its manual hydraulic steering system configured to steer its rear wheels the disclosed system could be used to bypass that manual hydraulic steering system and selectively steer at least one of the front wheels. The end (front or rear) of the work vehicle configured to be steered by the manual hydraulic steering system may be referred to as the "dominant end" of the work vehicle and the other end may be referred to as the "non-dominant end" of the work vehicle.

Thus, in the illustrated embodiment the front end of the work vehicle is the dominant end and the rear end of the work vehicle is the non-dominant end. The left and right front ground engaging units 104 and 106 may be referred to as left and right dominant end ground engaging units 104 and 106. The left and right rear ground engaging units 108 and 110 may be referred to as left and right non-dominant end ground engaging units 108 and 110. The left and right front hydraulic actuators 126 and 128 may be referred to as left and right dominant end hydraulic actuators 126 and 128. The left and right rear hydraulic actuators 130 and 132 may be referred to as left and right non-dominant end hydraulic actuators 130 and 132. The front and rear electro-hydraulic steering valves 156 and 158 may be referred to as dominant end and non-dominant end electro-hydraulic steering valves 156 and 158.

In the context of dominant and non-dominant ends, the methods described above may more generally be described as including a method of steering at least one non-dominant end ground engaging unit 108, 110 of a work vehicle 100 having steerable left and right dominant end ground engaging units 104, 106 and steerable left and right non-dominant end ground engaging units 108, 110 and a manually operated steering input 144 for steering the dominant end ground engaging units through a hydraulic steering circuit 142 connected to left and right dominant end hydraulic actuators 126, 128 configured to steer the left and right dominant end ground engaging units 104 and 106, respectively. The method may include: steering the at least one non-dominant end ground engaging unit 108, 110 using the steering input 144 as an input device; and preventing the dominant ground engaging units 104, 106 from steering when using the steering input 144 as the input device for steering the at least one non-dominant ground engaging unit 108, 110.

The method of steering described in the above paragraph may be a method of calibrating rear wheel (or non-dominant wheel) alignment as has been described in detail above. The system and method may also be more generally useful for other purposes. For example, the system may be used to temporarily make the work vehicle 100 a steer by wire machine and steering the rear (or non-dominant) axle for close quarters parking of the work vehicle 100.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A work vehicle, comprising:

a vehicle frame;

at least one steerable dominant end ground engaging unit supporting the vehicle frame from a ground surface;

at least one steerable non-dominant end ground engaging unit supporting the vehicle frame from the ground surface;

at least one dominant end hydraulic steering actuator configured to steer the at least one steerable dominant end ground engaging unit;

at least one non-dominant end hydraulic steering actuator configured to steer the at least one steerable non-dominant end ground engaging unit;

a steering input device configured to be manually moved by a human operator to input steering commands to the work vehicle;

a manually powered hydraulic pump driven by the manual movement of the steering input device to provide flow of hydraulic fluid to the at least one dominant end hydraulic steering actuator when the steering input device is manually moved by the human operator;

a steering input sensor connected to the steering input device and configured to detect the manual movement of the steering input device and to generate a steering input signal corresponding to the detected manual movement of the steering input device;

a dominant end electro-hydraulic steering valve configured to control flow of hydraulic fluid to the at least one dominant end hydraulic steering actuator to provide automated steering of the at least one steerable dominant end ground engaging unit;

a non-dominant end electro-hydraulic steering valve configured to control flow of hydraulic fluid to the at least one non-dominant end hydraulic steering actuator to provide automated steering of the at least one steerable non-dominant end ground engaging unit; and a controller operatively connected to the steering input sensor to receive the steering input signal and to control operation of the dominant end and non-dominant end electro-hydraulic steering valves, the controller being configured to provide a non-dominant end ground engaging unit alignment calibration mode in which:

the dominant end electro-hydraulic steering valve bypasses hydraulic fluid from the manually powered hydraulic pump past the at least one dominant end hydraulic steering actuator so that manual movement of the steering input device does not steer the at least one steerable dominant end ground engaging unit; and a command signal is sent to the non-dominant end electro-hydraulic steering valve to steer an individual one of the at least one steerable non-dominant end ground engaging unit at least in part in response to the steering input signal;

wherein the at least one steerable non-dominant end ground engaging unit includes a left non-dominant end ground engaging unit and a right non-dominant end ground engaging unit; and wherein the controller is configured such that the non-dominant end ground engaging unit alignment calibration mode includes a left non-dominant end ground engaging unit alignment calibration mode and a right non-dominant end ground engaging unit alignment mode so that a steering alignment of each of the left and right non-dominant end ground engaging units may be individually calibrated.

2. The work vehicle of claim 1, wherein:

the controller includes a display configured to display to the human operator an indicia representative of a steering angle of the individual one of the at least one steerable non-dominant end ground engaging unit.

3. The work vehicle of claim 1, further comprising:

a left non-dominant end ground engaging unit steering angle sensor configured to detect a steering angle of the left non-dominant end ground engaging unit relative to the vehicle frame; and a right non-dominant end ground engaging unit steering angle sensor configured to detect a steering angle of the right non-dominant end ground engaging unit relative to the vehicle frame.

4. The work vehicle of claim 3, wherein:

the controller includes a display configured to display to the human operator an indicia representative of the steering angle of a selected one of the left and right non-dominant end ground engaging units.

5. The work vehicle of claim 3, wherein:

the controller is configured such that a faster manual movement of the steering input device provides a larger steering angle change of a selected one of the left and right non-dominant end ground engaging units and a slower manual movement of the steering input device provides a smaller steering angle change of the selected one of the left and right non-dominant end ground engaging units, the faster manual movement being faster than the slower manual movement, and the larger steering angle change being larger than the smaller steering angle change.

6. A work vehicle, comprising:

a vehicle frame;

at least one steerable dominant end ground engaging unit supporting the vehicle frame from a ground surface;

at least one steerable non-dominant end ground engaging unit supporting the vehicle frame from the ground surface;

at least one dominant end hydraulic steering actuator configured to steer the at least one steerable dominant end ground engaging unit;

at least one non-dominant end hydraulic steering actuator configured to steer the at least one steerable non-dominant end ground engaging unit;

a steering input device configured to be manually moved by a human operator to input steering commands to the work vehicle;

a manually powered hydraulic pump driven by the manual movement of the steering input device to provide flow of hydraulic fluid to the at least one dominant end hydraulic steering actuator when the steering input device is manually moved by the human operator;

a steering input sensor connected to the steering input device and configured to detect the manual movement of the steering input device and to generate a steering input signal corresponding to the detected manual movement of the steering input device;

a dominant end electro-hydraulic steering valve configured to control flow of hydraulic fluid to the at least one dominant end hydraulic steering actuator to provide automated steering of the at least one steerable dominant end ground engaging unit;

a non-dominant end electro-hydraulic steering valve configured to control flow of hydraulic fluid to the at least one non-dominant end hydraulic steering actuator to provide automated steering of the at least one steerable non-dominant end ground engaging unit; and a controller operatively connected to the steering input sensor to receive the steering input signal and to control operation of the dominant end and non-dominant end electro-hydraulic steering valves, the controller being configured to provide a non-dominant end ground engaging unit alignment calibration mode in which:

the dominant end electro-hydraulic steering valve bypasses hydraulic fluid from the manually powered hydraulic pump past the at least one dominant end hydraulic steering actuator so that manual movement of the steering input device does not steer the at least one steerable dominant end ground engaging unit; and a command signal is sent to the non-dominant end electro-hydraulic steering valve to steer an individual one of the at least one steerable non-dominant end ground engaging unit at least in part in response to the steering input signal;

wherein:

the at least one steerable dominant end ground engaging unit includes a left dominant end ground engaging unit and a right dominant end ground engaging unit;

the at least one dominant end hydraulic steering actuator includes a left dominant end hydraulic steering actuator and a right dominant end hydraulic steering actuator; and

the dominant end electro-hydraulic steering valve includes an enable valve and a steer left proportional valve and a steer right proportional valve, the steer left proportional valve being configured to direct hydraulic fluid to both the left and right dominant end hydraulic steering actuators to steer the work vehicle to the left, and the steer right proportional valve being configured to direct hydraulic fluid to both the left and right dominant end hydraulic steering actuators to steer the work vehicle to the right.

7. The work vehicle of claim 6, wherein:
the controller in the non-dominant end ground engaging unit alignment calibration mode is configured such that the enable valve of the dominant end electro-hydraulic steering valve is off and the steer left and steer right proportional valves of the dominant end electro-hydraulic steering valve are positioned to bypass the hydraulic fluid from the manually powered hydraulic pump past the left and right dominant end hydraulic steering actuators.

8. A work vehicle, comprising:
a vehicle frame;
at least one steerable dominant end ground engaging unit supporting the vehicle frame from a ground surface;
at least one steerable non-dominant end ground engaging unit supporting the vehicle frame from the ground surface;
at least one dominant end hydraulic steering actuator configured to steer the at least one steerable dominant end ground engaging unit;
at least one non-dominant end hydraulic steering actuator configured to steer the at least one steerable non-dominant end ground engaging unit;
a steering input device configured to be manually moved by a human operator to input steering commands to the work vehicle;
a manually powered hydraulic pump driven by the manual movement of the steering input device to provide flow of hydraulic fluid to the at least one dominant end hydraulic steering actuator when the steering input device is manually moved by the human operator;
a steering input sensor connected to the steering input device and configured to detect the manual movement of the steering input device and to generate a steering input signal corresponding to the detected manual movement of the steering input device;
a dominant end electro-hydraulic steering valve configured to control flow of hydraulic fluid to the at least one dominant end hydraulic steering actuator to provide automated steering of the at least one steerable dominant end ground engaging unit;
a non-dominant end electro-hydraulic steering valve configured to control flow of hydraulic fluid to the at least one non-dominant end hydraulic steering actuator to provide automated steering of the at least one steerable non-dominant end ground engaging unit; and
a controller operatively connected to the steering input sensor to receive the steering input signal and to control operation of the dominant end and non-dominant end electro-hydraulic steering valves, the controller being configured to provide a non-dominant end ground engaging unit alignment calibration mode in which:

the dominant end electro-hydraulic steering valve bypasses hydraulic fluid from the manually powered hydraulic pump past the at least one dominant end hydraulic steering actuator so that manual movement of the steering input device does not steer the at least one steerable dominant end ground engaging unit; and
a command signal is sent to the non-dominant end electro-hydraulic steering valve to steer an individual one of the at least one steerable non-dominant end ground engaging unit at least in part in response to the steering input signal;
wherein:
the at least one steerable non-dominant end ground engaging unit includes a steerable left non-dominant end ground engaging unit and a steerable right non-dominant end ground engaging unit;
the at least one non-dominant end hydraulic steering actuator includes a left non-dominant end hydraulic steering actuator and a right non-dominant end hydraulic steering actuator;
the non-dominant end electro-hydraulic steering valve includes a left side enable valve and a left side steer left proportional valve and a left side steer right proportional valve, the left side steer left proportional valve being configured to direct hydraulic fluid to the left non-dominant end hydraulic steering actuator to steer the left non-dominant end ground engaging unit to the left, and the left side steer right proportional valve being configured to direct hydraulic fluid to the left non-dominant end hydraulic steering actuator to steer the left non-dominant end ground engaging unit to the right; and
the non-dominant end electro-hydraulic steering valve further includes a right side enable valve and a right side steer left proportional valve and a right side steer right proportional valve, the right side steer left proportional valve being configured to direct hydraulic fluid to the right non-dominant end hydraulic steering actuator to steer the right non-dominant end ground engaging unit to the left, and the right side steer right proportional valve being configured to direct hydraulic fluid to the right non-dominant end hydraulic steering actuator to steer the right non-dominant end ground engaging unit to the right.

9. The work vehicle of claim 1, wherein:
the work vehicle is a four wheel steering work vehicle;
the at least one steerable dominant end ground engaging unit includes left and right steerable dominant end wheels; and
the at least one steerable non-dominant end ground engaging unit includes left and right steerable non-dominant end wheels.

10. The work vehicle of claim 1, wherein:
the steering input device includes a steering wheel.

11. The work vehicle of claim 10, wherein:
the steering input sensor is a rotary sensor configured to detect a speed of rotation and/or an angle of rotation of the steering wheel.

* * * * *